United States Patent Office 3,700,487
Patented Oct. 24, 1972

3,700,487
POLYCARBONATE SUBSTRATE WITH DURABLE, ABRASION AND SCRATCH-RESISTANT, ANTI-FOGGING COATING
Harry D. Crandon, Woodstock, Conn., and Albert R. Le Boeuf, Sturbridge, Mass., assignors to American Optical Corporation, Southbridge, Mass.
No Drawing. Filed Feb. 23, 1971, Ser. No. 118,092
Int. Cl. G02c 7/02; B32b 27/06
U.S. Cl. 117—72                         1 Claim

ABSTRACT OF THE DISCLOSURE

At least one surface of a substrate, initially prepared to provide adequate bonding, is coated with a polyvinyl alcohol that has been lightly crosslinked to provide a permanent, abrasion-resistant antifog coating on the surface.

---

Various substrates, both transparent and opaque, have one or more of their surfaces subject to fogging when the cooled surface is exposed to moist air, or the like. Such fogging is well known with various transparent substrates such as vehicle windows, airplane windshield and windows, optical wear (eyeglasses, goggles, faceshields, etc.), binoculars, and other optical instruments, etc. Non-transparent, reflecting surfaces of glass, plastic, or metal are, likewise, subject to fogging or moisture condensation on their surfaces.

Earlier attempts to perfect a permanent antifogging substrate have been generally limited to specialized situations or specialized substrates and generally are not permanent. For example, antifogging polystyrene film formed by coating the film with an alkyd resin and two surfactants (alkyl aryl fatty sulfates or alkyl ester of polyoxyethylene, and an alkyl fatty sulfate) is shown in U.S. Pat. No. 3,437,617 issued Apr. 8, 1969, to Bogle. This film was used for packaging, and the antifogging coating is intended to prevent fogging and an unrestricted view of the packaged matter. Another packaging film antifogging system is disclosed in U.S. Pat. No. 3,425,976 issued Feb. 4, 1969, to Adams et al., wherein a vinylchloride film includes a monoglyceride of fat forming fatty acids or mixtures of monoglycerides and diglycerides of the fat forming acids.

Similarly, a transparent viewing material, made of cellulose acetate, cellulose butyrate or polyvinyl chloride having vinyl sulfonic acid ester incorporated therein, is suggested in U.S. Pat. No. 3,433,653, issued Mar. 18, 1969, to Van der Smissen et al. In this case, the vinyl sulfonic acid hydrolyzes on contact with water forming a surfactant, but the surfactant is subject to being washed away. A further attempt to make a permanent antifogging substrate is shown in U.S. Pat. No. 3,488,215, issued June 6, 1969, to Shepherd et al., wherein a substrate is coated with a hydrophilic acrylate or methacrylate polymer which is sprayed onto the substrate in films up to 10 mils or more and then polymerized by baking.

According to the present invention there is provided in conjunction with the surface of a substrate to be protected, a polyvinyl alcohol coating which has been properly conditioned so as to be lightly crosslinked, said coating being applied to said surface only after said surface has been initially suitably treated in accordance with the kind of substrate material employed to provide a permanent bonding layer therebetween, and a process for producing said coating which is inexpensive and easy to apply to the substrate whether of glass, plastics, metal, or the like and which coating provides a permanent exposed antifogging surface layer which is durable, abrasion-resistant, and is compatible with said substrate.

Accordingly, it is an important object of the present invention to provide such a permanent, transparent antifogging coating to at least one or more surfaces of a substrate and its method of manufacture.

Another object of the invention is to provide an inexpensive and easy-to-apply antifogging coating of the character described to glass, plastic, or metal substrates.

Yet another object of the invention is to provide an abrasion-resistant, transparent antifog coating of the character described on transparent substrates.

These and other objects and advantages of the invention may be readily ascertained by reference to the following description which is intended as illustrative of the invention and a specific limitation thereto.

In general, the process of the invention provides for initially preparing the surface of a substrate to insure adequate bonding of the antifogging coating. For example, for polycarbonate plastic such as "Lexan," the substrate is either dipped in an alkyl titanate solution or is spun and the solution applied to the spinning substrate. The coated substrate is air dried and then baked for a few minutes at a moderately elevated temperature. The treated surface is then coated with a thin polyvinyl alcohol solution containing an acid crosslinking agent, air dried and again baked at a moderately elevated temperature. This treatment produces a thin, transparent film which has excellent antifog properties, is durable and abrasion-resistant.

More specifically, a coating procedure for a substrate of polycarbonate plastic is as follows:

A first solution is made by dissolving about 5 grams of tetraisopropyl orthotitanate in 1000 grams of anhydrous n-butanol. A substrate is then dipped in this 0.5% solution and withdrawn at a rate of about 1.3–1.5 inches per minute. The coated substrate is then air dried and is baked for about 15 minutes at about 115° C.

A second solution is made by adding about 30 grams of polyvinyl alcohol (GelvaTol (1–90)) from Shawinigan Resins, a subsidiary of Monsanto Chemical Company, to about 500 grams of boiling demineralized water. The solution should be stirred rapidly and maintained at about 100° C. or boiling throughout the preparation. As soon as solvation of the polyvinyl alcohol has occurred (20–30 minutes) a sufficient quantity of demineralized water is added to bring the solution up to its original level. Then ethyl alcohol, at about room temperature, is added to the resultant solution until the total weight of the solution is about 1000 grams. About 1 to 2 drops of Triton X–100 (surface active agent or wetting agent) made by Rohm and Haas is added to the mixture. The resulting solution is then filtered while still hot through a 14 micron pressure filter. After filtration, the solution is cooled to about room temperature, and 2.2 cc. of 57% hydriodic acid is added as the crosslinking agent. This gives a solution having a pH of approximately 2.3.

The substrate coated with the baked tetraisopropyl orthotitanate is then dipped in the polyvinyl alcohol solution, which is approximately 3%, and is withdrawn at the same rate as the previous dip, about 1.3–1.5 inches per minute. The substrate is air dried, and then is baked for about 35 minutes to about 115° C.

The dipping operations are preferably carried out at about room temperature and with a relative humidity on the order of 35%. The room temperature is assumed to be 72° F.±5°. The withdrawal rate of substrate from each solution is about 1–2 inches per minute and preferably about 1.5 inches per minute. The curing temperature is preferably in the range of 115° C., however, the range may be from room temperature to about 150° C., with an adjustment of the time. The lower the temperature, the longer time is necessary for the crosslinking of the PVA. The pH of the solution which can be from 1.5 to 2.5 also determines the rate of time, the lower the pH, the faster the cure.

The antifog coating has been applied successfully to other substrates such as glass, polymethyl methacrylate, cast CR39 (diethylene glycol bis allyl carbonate), a copolymer of CR39 and methyl methacrylate, metal, or the like.

Adequate bonding of the antifog coating to various substrates may be obtained by means other than by the use of alkyl titanates as the first layer. Glass, CR39, CR39 copolymer, or cellulose esters such as cellulose acetate, butyrate or propionate may use a hydrolytic surface treatment by dipping in aqueous or alcoholic caustics such as sodium or potassium hydroxide. Polymethyl methacrylate, glass, or polycarbonate may use a bonding coat of polyvinyl butyral. Good bonding on acrylics may be obtained by a nylon lacquer such as "Milvex 4000" manufactured by General Mills.

A comparison of the physical properties of various antifog coatings on molded polycarbonate lenses is shown in the following table:

The use of hydriodic acid, as opposed to other acids such as sulfuric, phosphoric, hydrochloric, hydrobromic, etc., gives a good control of the degree of crosslinking and a rapid cure. The baking temperatures and times for both the initial coating and the second coating are substantially lower using hydroiodic acid. The preparation of the solutions for the coatings is quite simple.

The coating of the invention has provided permanent antifogging for glass, plastic, and metal and with such eye coverings as welding goggles, safety goggles, and various other types of eye protection equipment. The antifogging coating, is, also, very effective in the completely enclosed surfaces of optical and other instruments such as the inside surfaces, both metal and glass, of binoculars, microscopes, watches, meters and the like.

We claim:

1. The combination comprising a polycarbonate substrate and a durable, abrasion and scratch-resistant, antifogging coating on at least one surface of said polycarbonate substrate, said coating comprising an under layer tenaciously adhering to said one surface of said polycarbonate substrate, said under layer coating being an alkyl titanate, and a lightly crosslinked polyvinyl alcohol coating bonded to said under layer coating and forming therewith said durable, abrasion and scratch-resistant, antifogging coating for said one surface.

| Coating No. | 1 | 2 | 3 |
|---|---|---|---|
| Property: | | | |
| Color | Clear | Light yellow | Clear. |
| Haze gain after 25 strokes [1] | 2.5% | 6.1% | 21.6%. |
| Fog resistance to breath at 72° F. | Excellent | Excellent | Excellent. |
| Fog resistance to breath at 35° F. (piece placed 4" from mouth) | Fog after 3-4 breaths | Immediately fogged | Excellent but will become water saturated. |
| Fog resistance to steam | Fog after 3-4 sec. doesn't become water saturated. | Fog after 2-3 sec | Excellent but becomes water saturated—must be dried between tests. |

[1] Haze gain of uncoated Lexan plastic, 22.6% after 25 strokes—Haze gain is a measure of abrasion-resistance under controlled conditions.

NOTE.—The coatings are: 1=Coating according to the invention on Lexan; 2=Hydron—a coating by National Patent Development Corp., N.Y., N.Y.; 3=Polyvinyl butyral containing Aerosol OT.

References Cited

UNITED STATES PATENTS

| | | | |
|---|---|---|---|
| 3,484,157 | 12/1969 | Crandon et al. | 117—72 X |
| 2,143,482 | 1/1939 | Herrmann et al. | 106—13 |
| 2,888,367 | 5/1959 | Greyson | 117—75 X |
| 3,352,707 | 11/1967 | Pickard | 117—72 |
| 2,998,324 | 8/1961 | Hirt | 117—76 FX |
| 3,481,763 | 12/1969 | Hider et al. | 117—47 AX |
| 3,082,117 | 3/1963 | Schilly | 117—76 F |
| 3,148,985 | 9/1964 | Ossenbrunner et al. | 117—76 FX |
| 3,352,708 | 11/1967 | Lyon et al. | 117—72 |
| 3,515,579 | 6/1970 | Shepherd et al. | 106—13 X |

RALPH HUSACK, Primary Examiner

U.S. Cl. X.R.

106—13; 117—33.3, 47 A, 73, 75, 76 F, 138.8 F; 350—175 R; 351—166